(12) United States Patent
Kuznetsov et al.

(10) Patent No.: US 9,304,190 B2
(45) Date of Patent: Apr. 5, 2016

(54) METHOD AND SYSTEM FOR UNVEILING HIDDEN DIELECTRIC OBJECT

(75) Inventors: Andrey Kuznetsov, St. Petersburg (RU);
Igor Gorshkov, St. Petersburg (RU);
Valery Averyanov, St. Petersburg (RU)

(73) Assignee: APSTEC SYSTEMS LTD, Iklin (MT)

( * ) Notice: Subject to any disclaimer, the term of this patent is extended or adjusted under 35 U.S.C. 154(b) by 960 days.

(21) Appl. No.: 13/528,412

(22) Filed: Jun. 20, 2012

(65) Prior Publication Data

US 2013/0033574 A1 Feb. 7, 2013

Related U.S. Application Data

(63) Continuation-in-part of application No. 13/120,494, filed on Aug. 4, 2011, now Pat. No. 8,228,374, and a continuation-in-part of application No. 13/403,256, filed on Feb. 23, 2012, now Pat. No. 8,670,021.

(51) Int. Cl.
| | |
|---|---|
| *G01S 7/41* | (2006.01) |
| *G01V 8/00* | (2006.01) |
| *G01S 13/89* | (2006.01) |
| *G01S 13/86* | (2006.01) |
| *G01S 13/88* | (2006.01) |

(52) U.S. Cl.
CPC .............. *G01S 7/41* (2013.01); *G01S 13/867* (2013.01); *G01S 13/887* (2013.01); *G01S 13/89* (2013.01); *G01V 8/005* (2013.01)

(58) Field of Classification Search
CPC ......................................................... G01S 7/41
See application file for complete search history.

(56) References Cited

U.S. PATENT DOCUMENTS

| | | | |
|---|---|---|---|
| 2008/0129581 A1* | 6/2008 | Douglass et al. | 342/52 |
| 2013/0033574 A1* | 2/2013 | Kuznetsov et al. | 348/46 |

* cited by examiner

*Primary Examiner* — James Pontius
(74) *Attorney, Agent, or Firm* — Nadya Reingand

(57) ABSTRACT

The invention relates to the remote measurement of the dielectric permittivity of dielectrics. A 3D microwave and a 3D optical range images of an interrogated scene are recorded at the same time moment. The images are digitized and overlapped. A space between the microwave and optical image is measured, and a dielectric permittivity of the space between these images is determined. If the dielectric permittivity is about 3, then hidden explosive materials or components of thereof are suspected. The invention makes it possible to remotely determine the dielectric permittivity of a moving, irregularly-shaped dielectric objects.

20 Claims, 2 Drawing Sheets

METHOD AND SYSTEM FOR UNVEILING HIDDEN DIELECTRIC OBJECT

CROSS-REFERENCE TO RELATED APPLICATIONS

This application is a Continuation-in-part of U.S. patent application Ser. No. 13/120,494 filed Aug. 4, 2011 now U.S. Pat. No. 8,228,374 and U.S. patent application Ser. No. 13/403,256 filed Feb. 23, 2012 now U.S. Pat. No. 8,670,021.

FIELD OF INVENTION

The invention relates to the field of electrical engineering and, more specifically, to the remote measurement of the dielectric permittivity of dielectrics. In particular, it provides a method and system for detection of dielectric explosive substances concealed under clothes on the human body.

BACKGROUND OF THE INVENTION

One of known methods for determining the dielectric permittivity of a material consists of irradiating a sample with an electromagnetic wave using a double-arm emitter, changing difference between the signal's phases in the arms of the emitter and measuring amplitude of the wave transmitted at an angle and determining the dielectric permittivity. By changing the difference between the signal's phases in the arms of the emitter, the dependence of the amplitude of the transmitted wave on the length of the arm is eliminated. The dielectric permittivity is determined by the following formula:

$$\varepsilon = \frac{\lambda_0^2}{\sin^2 Q} \cdot \left(\frac{1}{\Delta} - \frac{1}{\lambda_b}\right)^2,$$

where $\lambda_o$—free-space wavelength; $\lambda_b$—wavelength in the double-armed emitter; $\Delta$—period of amplitude "zero" for the transmitted wave, and angle $\theta$ is chosen according to the relationship $$\left(\frac{d_k}{\lambda_b} - 1\right) < \frac{d_k}{\lambda_0} \sqrt{\varepsilon} \sin\theta < \left(\frac{d_k}{\lambda_b} + 1\right),$$

where $d_k$—maximum size of the emitter's arm, see USSR Patent No. SU 1800333 A1.

The disadvantage of this method is that it requires a contact between the emitter and the object, the dielectric permittivity of which is to be determined. Moreover, this sample needs to have a flat surface to ensure a contact with the emitter. These requirements do not allow using this method for remote determination of the dielectric permittivity of objects.

Another known method to determine the dielectric permittivity of a dielectric object employs irradiating the dielectric object with coherent microwave radiation at N frequencies. The irradiation is carried out against the background of reflectors, whereby boundaries between the object's layers, or a boundary between the dielectric object and air, or a physical body, on which the tested dielectric object is placed, serve as the reflectors. The signal reflected from the dielectric object and the reflector is registered. The detected signals are converted in the time domain. Peak temporal components in the temporal spectrum are determined and the times of the determined peak temporal components are measured. These data are used to determine the dielectric permittivity and the thickness of the layers. Probing and receiving is carried out in a sector of angles. Dielectric permittivity and thickness of layers are then determined from the formulae:

$$\varepsilon_i = \frac{\sqrt{\varepsilon_1} \sin\theta_{na\partial 1}^{(i)} * c * \left(t_i - \frac{2}{c} \sum_{p=1}^{i-1} \frac{\sqrt{\varepsilon_p} \Delta l_p}{\sqrt{1 - \varepsilon_1/\varepsilon_p * \sin^2\theta_{na\partial 1}^{(i)}}}\right)}{2 * \left(\frac{d}{2} - \sum_{p=1}^{i-1} \Delta l_p * \frac{\varepsilon_1 \sin\theta_{na\partial 1}^{(i)}}{\sqrt{\varepsilon_p - \varepsilon_1 \sin^2\theta_{na\partial 1}^{(i)}}}\right)};$$

$$\Delta l_i = \left(t_i - \frac{2}{c} \sum_{p=1}^{i-1} \frac{\sqrt{\varepsilon_{p_1}} * \Delta l_p}{\sqrt{1 - \varepsilon_1/\varepsilon_p * \sin^2\theta_{na\partial 1}^{(i)}}}\right) * \frac{c * \sqrt{1 - \frac{\varepsilon_1}{\varepsilon_i} \sin^2\theta_{pa\partial 1}^{(i)}}}{2\sqrt{\varepsilon_i}},$$

where i—the number of the layer; $\varepsilon_i$ and $\varepsilon_p$—dielectric permittivity of layers i and p; $\varepsilon_1$—the dielectric permittivity of the medium in which probing and receiving of signals is performed; $\Delta l_i$—thickness of i-layer;

$$\Delta l = \frac{h_1 + h_2}{2}$$

where $h_1$ and $h_2$ are heights between the border of the first and second layers to the points from which probing is performed and the signal receiving points respectively; $\theta_{na\partial 1}^{(i)}$ is angle of received signal reflected from the border between layers i and i+1, c—speed of light; $t_i$—frequency of peak i-constituent of the time spectrum which corresponds to the reflection of the signal from the border between layers i and i+1, and d—projection on the probe surface of the distance between the point of probing and the signal receiving point, see Russian Patent No. RU 2039352 C1.

The disadvantage of this method, which is taken as a prototype for the present invention, is the requirement of parallel arrangement of the layers of the dielectric object. If the object consists of a single layer, its sides should be parallel. Therefore this method can be used solely for custom-made objects with required features. Moreover, this method also requires that the angles of incidence and reflection of the microwave radiation towards the dielectric object are well-defined.

The aforementioned renders it impossible to use this method in practice for determining dielectric permittivity of a moving and hidden object with non-parallel layers or sides, particularly for covert detection of the presence of dielectric explosive compounds hidden on a human body. It is known that dielectric permittivity of the vast majority of such compounds lies between 2.9-3.1.

SUMMARY

The purpose of the present invention is to provide a method and a system for remotely determining the dielectric permittivity of a moving dielectric object of irregular shape.

The dielectric permittivity of a dielectric object is determined when the object is placed against the background of a reflector. The method includes recording a 3D microwave and a 3D optical range images of an interrogated scene at the same time moment, digitizing all images and overlapping them in one common coordinate system; determining a space between the microwave and optical image, calculating a dielectric permittivity $\varepsilon$ of the space; and concluding the absence of hidden dielectric object where the dielectric permittivity is less than a threshold value. If the dielectric permittivity is in the range of 2.9-3.1, then the conclusion is made on the presence of a hidden object.

The dielectric permittivity $\varepsilon$ of the dielectric object is determined from the relationship:

$$\varepsilon = \left(\frac{z_2 - z_3}{z_1 - z_3}\right)^2,$$

where
the distance $Z_1$ is between the microwave radiation source and a section of the microwave image of the reflector that is free of the dielectric object, and the distance $Z_2$ is between the microwave radiation source and the section of the microwave image of the reflector in the section of the dielectric object; and the distance $Z_3$ between the microwave radiation source and the video image of the dielectric object.

In one embodiment the 3D microwave image is formed by illumination of the scene by microwave radiation from one emitter and recording the scene image by at least two microwave detectors. In another embodiment the illumination is performed by at least two separate microwave emitters that illuminate the scene from different angles, and the recording is performed by one microwave detector.

In one embodiment the microwave emitter radiation is a coherent microwave radiation at N frequencies, which optionally can be equidistant. These frequencies are not related to the lines of absorption of the irradiated media.

The 3D optical image is formed by illumination of the scene by optical radiation and recording the scene image by at least two optical detectors. Different types of processing may apply. In the preferred embodiment, a digital signal processor (DSP) performs a coherent processing, which calculates the 3D image taking into account both amplitude and phase information of electromagnetic fields reflected from the interrogated scene.

BRIEF DESCRIPTION OF DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION OF THE PREFERRED EMBODIMENT

Figure 1:
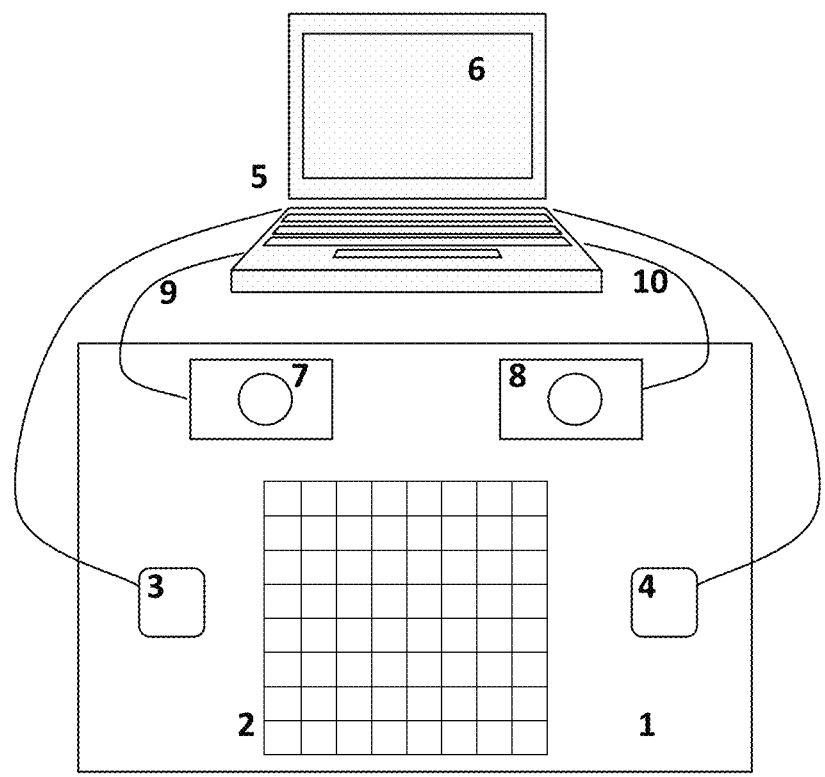
FIG. 1 shows one embodiment of the setup to determine dielectric permeability of dielectric objects.

In the following description, for purposes of explanation, specific examples are set forth to provide a thorough understanding of the present invention. However, it will be apparent to one skilled in the art that these specific details are not required in order to practice the present invention. The same techniques can easily be applied to other types similar systems.

Implementation of the distinguishing features of the invention results in new important features of the claimed subject matter. In particular the invention makes it possible to remotely determine the dielectric permittivity of a moving, irregularly-shaped dielectric object.

In order to demonstrate the method for determining the dielectric permittivity of a dielectric object against the background of a reflector, a test dummy was used to mimic the human body serving as the reflector. The dummy had a dielectric object (beeswax) attached to the body. The goal of the experiment was to determine the dielectric permittivity of the beeswax. The test dummy with the attached dielectric object was irradiated with coherent microwave radiation at 14 equidistant frequencies in the range of frequencies from 8 to 12 GHz. Irradiation was performed using a switched planar antenna array with hexagonal configuration of emitting elements, and consisting of 256 primary emitters. The reflected signal, in the form of two quadrature components, was received by two parallel receiving channels and detected by 12-digit analog-to-digital converters. The data from the output of the receiving channels corresponding to the electrical component of the detected scattered electromagnetic field were transferred to a computer, where a microwave image was formed using focusing method (coherent processing). The microwave image corresponded to only one three dimensional surface formed with points corresponding to the maximal values of intensity of the reconstructed configuration of the scatterers of the dielectric object and the reflector. Simultaneously with irradiation by microwave radiation, a video image of the dielectric object and the reflector was obtained using two digital spatially-separated video cameras SDU-415. Using this data, the three dimensional video image of the section with the dielectric object and the reflector was constructed. The microwave image and the three dimensional video image were converted into a general system of coordinates. In this particular case, the general system of coordinates was set by the antenna array plane and an axis perpendicular to it and intersecting the antenna at its center. The microwave image and the three dimensional video image were analyzed in the general system of coordinates. The value of $Z_1$—the distance between the source of microwave radiation and the section of the microwave image of the reflector, free of the dielectric object was determined, and the distance $Z_2$ between the source of microwave radiation and the section of the microwave image of the reflector, where the dielectric object was located, was determined. Using the video image the distance $Z_3$ between the microwave radiation source and the video image of the dielectric object was determined. The dielectric permittivity of the object against the background of the reflector was determined from the relationship:

$$\varepsilon = \left(\frac{z_2 - z_3}{z_1 - z_3}\right)^2,$$

In our particular example, the distances were the following:
$Z_1$=122 cm, $Z_2$=128 cm, $Z_3$=112 cm, and $\varepsilon$=2.56.

Based on the determined value of $\varepsilon$ for the inspected object, one can conclude that this object does not belong to widely spread and currently used explosive compounds, such as TNT, hexogen, tetryl or a plastic explosive.

Figure 2:
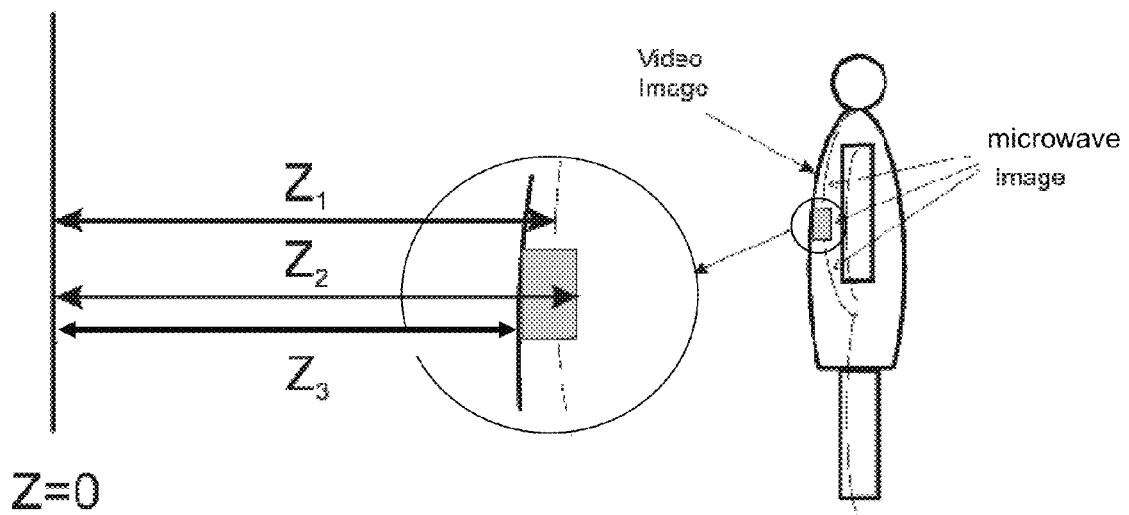
FIG. 2 illustrates the overlapping of the microwave and video images.

One embodiment of a setup 1 for unveiling hidden dielectric objects is shown in FIG. 1. The space is scanned with microwave radiation using two or more elemental microwave emitters 2. The signal reflected from the monitored area is picked up by one or more parallel detection channels 3 and 4. The received signal undergoes coherent processing in digital signal processing unit (DSP) 5 to obtain maximum intensity values of the restored configuration of scattering objects in the monitored area, depending on the distance from the elemental emitters to the target. The information obtained after processing is then displayed on the display 6 by constructing a microwave image corresponding to a three-dimensional surface. A video image of the target is also obtained using two or more video cameras 7 and 8 which are synchronized with the microwave emitters 2 via the processing unit 5. The obtained video images are transmitted via channels 9 and 10 into the processing unit and are further converted to its digital form, and a three-dimensional image of the target is constructed and displayed on the display 6. The three-dimensional video image and the microwave image are then transferred into a general coordinate system and the distances $Z_1$, $Z_2$ and $Z_3$ are calculated. When you are looking at the system 1 at FIG. 1, you are in the position of the person, who is monitored. The mutual positioning of the microwave image (thin line) and the video image (thick line) is shown in FIG. 2.

This method could also be used for other purposes, for example for determining the physical characteristics of dielectrics used in electrical industry.

For carrying out the invention known materials and equipment are used. Therefore, in applicant's opinion, the present invention complies with the requirement of industrial applicability.

Although the present invention has been described with reference to specific exemplary embodiments, it will be evident that the various modification and changes can be made to these embodiments without departing from the broader spirit of the invention as set forth in the claims. Accordingly, the specification and drawings are to be regarded in an illustrative sense rather than in a restrictive sense.

What is claimed is:

1. A method for unveiling hidden dielectric objects in an interrogated area, comprising:
    recording a 3D microwave image and a 3D optical range image of an interrogated scene at a same time moment, digitizing all images and overlapping them in one common coordinate system; determining a distance between a microwave image and an optical image of a region, calculating a dielectric permittivity ∈ of a space based on the determined distance; and concluding an absence of a hidden dielectric object where the dielectric permittivity is less than a threshold value.

2. The method of claim 1, further comprising concluding the presence of hidden dielectric objects if the dielectric permittivity is about 3, which corresponds to explosive materials or components of thereof.

3. The method of claim 1, wherein the 3D microwave image is formed by illumination of the scene by microwave radiation and recording the scene image by at least one microwave detectors.

4. The method of claim 3, wherein the 3D microwave image is formed by irradiating the area by at least two separate microwave emitters that illuminate the scene from different angles.

5. The method of claim 3, wherein at least two microwave emitters irradiate the area sequentially.

6. The method of claim 3, wherein the microwave emitters irradiate the area simultaneously.

7. The method of claim 3, wherein at least two microwave emitters have a spectrum consisted of multiple frequencies.

8. The method of claim 7, wherein the frequencies are equidistant.

9. The method of claim 3, wherein the 3D microwave image is formed by irradiating the area by hundreds of elemental microwave emitters.

10. The method of claim 3, where the area is irradiated by one microwave emitter and the 3D microwave image is formed from signals coming from at least two microwave detectors.

11. The method of claim 1, wherein the 3D optical range image is formed by illumination of the scene by optical radiation and recording the scene image by at least two optical detectors.

12. The system of claim 1, wherein a digital signal processor (DSP) performs a coherent processing, which calculates the 3D microwave image taking into account both amplitude and phase information of electromagnetic fields reflected from the interrogated scene.

13. The system of claim 1, wherein the interrogated scene is changing in time, and the microwave and optical range images correspond to the same moment of moving scene.

14. The system of claim 13, wherein the method is used to unveil hidden suicide bombs in the crowd of moving people.

15. The system of claim 1, wherein the dielectric permittivity is determined using a formula:

$$\varepsilon = \left(\frac{z_2 - z_3}{z_1 - z_3}\right)^2$$

where the distance $Z_1$ is between a microwave radiation source and a section of the microwave image of a reflector that is free of the dielectric object, and the distance $Z_2$ is between the microwave radiation source and a section of the microwave image of the reflector in the section of the dielectric object; and the distance $Z_3$ is between the microwave radiation source and the video image of the dielectric object.

16. A system to unveil a hidden dielectric object in an interrogated area, comprising: at least two microwave (mw) sources and at least one mw receiver forming mw images of the interrogated area; at least two optical range cameras recording the interrogated area; a digital signal processor (DSP) receiving the microwave and optical images recorded at the same time and forming a three-dimensional (3D) microwave image and a 3D optical image of the interrogated area, both the 3D microwave image and 3D optical image are transferred into a common coordinate system and overlapped, and wherein a decision on an absence of hidden dielectric object is made after determining a distance between the microwave image and the optical image of the interrogated area, calculating a dielectric permittivity ∈ of a space based on the determined distance; and the dielectric permittivity being less than a threshold value.

17. The system of claim 16, further comprising wherein a presence of hidden dielectric objects is concluded if the dielectric permittivity is about 3, which corresponds to explosive materials or components of thereof.

18. The system of claim 16, wherein the dielectric permittivity ∈ is determined using the following formula:

$$\varepsilon = \left(\frac{z_2 - z_3}{z_1 - z_3}\right)^2$$

where the distance $Z_1$ is between a microwave radiation source and a section of the microwave image of a reflector that is free of the dielectric object, and the distance $Z_2$ is between the microwave radiation source and a section of the microwave image of the reflector in the section of the dielectric object; and the distance $Z_3$ is between the microwave radiation source and the video image of the dielectric object.

19. The system of claim 16, wherein the mw receiver includes a broadband Vivaldi antenna.

20. The system of claim 16, wherein the 3D microwave image is formed by illumination of the scene by microwave radiation and recording the scene image by at least two microwave detectors, and the microwave images are formed by irradiating the area by at least two separate microwave emitters that illuminate the scene from different angles.

* * * * *